US012700220B2

(12) United States Patent
Kale et al.

(10) Patent No.: US 12,700,220 B2
(45) Date of Patent: Aug. 4, 2026

(54) SYSTEM AND METHOD FOR ITERATIVE REFINEMENT AND CURATION OF IMAGES DRIVEN BY VISUAL TEMPLATES

(71) Applicants:Robert Bosch GmbH, Stuttgart (DE);
Robert Bosch Engineering and Business Solutions Private Limited, Bangalore (IN)

(72) Inventors: Amit Arvind Kale, Bangalore (IN);
Sonam Singh, Uttar Pradesh (IN)

(73) Assignees: Robert Bosch GmbH, Stuttgart (DE);
Robert Bosch Engineering and Business Solutions, Karnataka (IN)

( * ) Notice: Subject to any disclaimer, the term of this patent is extended or adjusted under 35 U.S.C. 154(b) by 333 days.

(21) Appl. No.: 18/305,338

(22) Filed: Apr. 22, 2023

(65) Prior Publication Data

US 2023/0351734 A1 Nov. 2, 2023

(30) Foreign Application Priority Data

Apr. 29, 2022 (IN) .............................. 202241025111

(51) Int. Cl.
*G06V 10/774* (2022.01)
*G06V 10/74* (2022.01)
*G06V 10/77* (2022.01)

(52) U.S. Cl.
CPC .......... *G06V 10/774* (2022.01); *G06V 10/761* (2022.01); *G06V 10/7715* (2022.01)

(58) Field of Classification Search
CPC ............... G06V 10/774; G06V 10/761; G06V
10/7715; G06V 10/764; G06V 10/82;
G06V 10/40; G06V 10/54; G06V 10/56;
G06V 20/582; G06V 20/58; G06V
20/588; G06F 16/5838; G06F 16/5862;
G06N 3/04; G06N 3/0895
See application file for complete search history.

(56) References Cited

U.S. PATENT DOCUMENTS 9,817,847 B2 11/2017 Shen et al.
10,713,794 B1 * 7/2020 He ......................... G06N 3/084
(Continued)

OTHER PUBLICATIONS

Zhang et al, Self-Supervised Visual Representation Learning from Hierarchical Grouping, 2020, arXiv:2012.03044v1, pp. 1-12. (Year : 2020).*

*Primary Examiner* — Kathleen M Broughton
(74) *Attorney, Agent, or Firm* — Maginot, Moore & Beck LLP

(57) ABSTRACT

A method and system for curating images containing specific objects specified by visual templates are described. A set of visual image templates representing an input object is provided to a pre-trained deep neural network (DNN). A feature extraction module is configured to extract a set of feature vectors representing a set of visual image templates and a list of images stored in a DNN-based feature database. A patch generation module is configured to generate image patches representing the input object, from a set of relevant neighbor images providing probable regions where the visual image templates are getting matched. The patch generation module is further configured to train a new network model in a self-supervised manner, with image patches generation by the patch generation module, in an iterative manner.

7 Claims, 2 Drawing Sheets

(56)          References Cited

U.S. PATENT DOCUMENTS

| 10,810,252 | B2 | 10/2020 | Kerr et al. | |
|---|---|---|---|---|
| 2016/0217344 | A1* | 7/2016 | Misra | G06F 18/217 |
| 2017/0294027 | A1* | 10/2017 | Babenko | G06T 7/507 |
| 2017/0330059 | A1* | 11/2017 | Novotny | G06V 10/7515 |
| 2018/0285686 | A1* | 10/2018 | Pinheiro | G06F 18/214 |
| 2019/0370384 | A1 | 12/2019 | Dalek et al. | |
| 2020/0012943 | A1* | 1/2020 | Neves | G06N 3/08 |
| 2020/0394458 | A1* | 12/2020 | Yu | G06V 10/454 |
| 2022/0147743 | A1* | 5/2022 | Roy | G06V 10/774 |

* cited by examiner

SYSTEM AND METHOD FOR ITERATIVE REFINEMENT AND CURATION OF IMAGES DRIVEN BY VISUAL TEMPLATES

This application claims priority under 35 U.S.C. § 119 to application no. IN 202241025111, filed on Apr. 29, 2022 in India, the disclosure of which is incorporated herein by reference in its entirety.

The present subject matter relates, in general, to iteratively curate images containing specific objects specified by visual templates, and, particularly, to a system that can iteratively refine, and curate images based on pre-defined visual templates.

BACKGROUND

Various image retrieval techniques involve computer-based object recognition. The computer-based object recognition incorporates image processing to identify instances of objects in images and performs annotations of the objects for object detection and tracking. The image processing may also be implemented to interpret location, orientation, and behavior of an object in an image with respect to other objects present in the image.

Large amount of data is collected for applications in domains like Autonomous Driving (AD), CCTV surveillance etc. To train learning models on this data for specific use cases e.g. road signs or road markings, images need to be curated and labeled (for supervised learning). Usual process to curate this data is manual which is cost and time expensive. The ability to curate data for such use cases in an automated way can greatly assist the human curators. The problem becomes challenging since these objects of interest occur in unlabeled diverse scenes e.g. driving scene captured by a vehicle mounted camera. These scenes contain various objects from different classes e.g. buildings, vehicles, pedestrians etc. making the curation difficult.

An existing patent disclosure US20190370384, (Ensemble-based data curation pipeline for efficient label propagation) discloses method and architecture allow labeled data to be initialized and curated by the use of label propagation, clustering and creation of dedicated classifiers for each dataset. These dedicated classifiers are retrained as the dataset grows and ensure that each dataset is kept free from outliers and noise.

Another existing patent disclosure U.S. Pat. No. 10,810,252B2, (Automated image curation for machine learning deployments): disclose techniques for data curation and image evaluation. A first image is captured, and a first indication of a first item is received. A first identifier of the first item is then identified based on the first indication. Further, based on the first indication, it is determined that the first image depicts the first item. The first image is labeled with the first identifier, and a machine learning (ML) model of an ML system is trained based on the labeled first image.

The existing patent disclosure U.S. Pat. No. 9,817,847B2 (NEURAL NETWORK IMAGE CURATION CONTROL): In this work, neural network image curation techniques are described. In one or more implementations, curation is controlled of images that represent a repository of images. A plurality of images of the repository are curated by one or more computing devices to select representative images of the repository. The curation includes calculating a score based on image and face aesthetics, jointly, for each of the plurality of images through processing by a neural network, ranking the plurality of images based on respective said scores, and selecting one or more of the plurality of images as one of the representative images of the repository based on the ranking and a determination that the one or more said images are not visually similar to images that have already been selected as one of the representative images of the repository.

BRIEF DESCRIPTION OF THE DRAWINGS

The detailed description is provided with reference to the accompanying figures, wherein.

DETAILED DESCRIPTION

Figure 1:
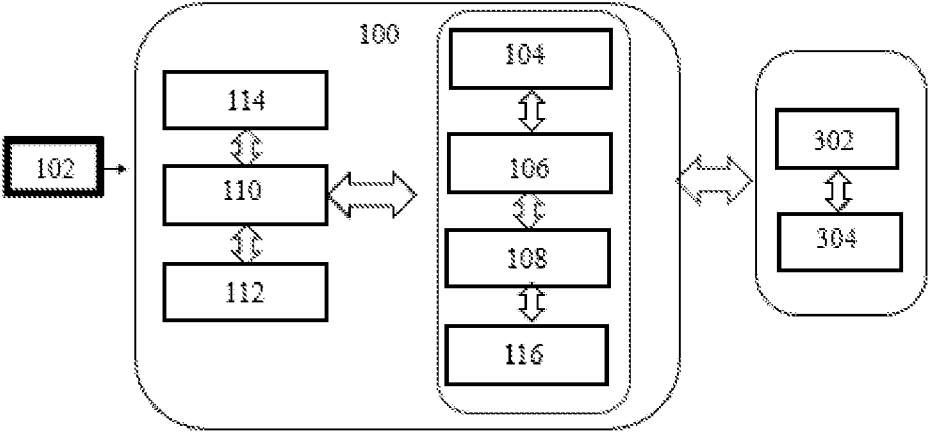
FIG. 1 illustrates a system environment for iteratively curating images containing specific objects specified by visual templates, in accordance with an example implementation of the present subject matter.

FIG. 1 illustrates a system environment for iteratively curating images containing specific objects specified by visual templates, in accordance with an example implementation of the present subject matter. The present subject matter describes various approaches to refine, and curate images based on pre-defined visual templates. The core of the present disclosure is to describe a system that can iteratively refine, and curate images based on pre-defined visual templates. These templates represent the objects or scenes which need to be curated further for example road signs or road markings.

The system environment may include a computing system 100 and a neural network architecture. The computing system 100 may be communicatively coupled to the neural network architecture. In an example, the computing system 100 may be directly or remotely coupled to the neural network architecture. Examples of the computing system 100 may include, but are not limited to, a laptop, a notebook 25 computer, a desktop computer, and so on.

The computing system 100 may include a memory 110. The memory 110 may include any non-transitory computer-readable medium including, for example, volatile memory, such as static random-access memory (SRAM) and dynamic random-access memory (DRAM), and/or non-volatile memory, such as read only memory (ROM), erasable programmable ROM, flash memories, hard disks, optical disks, and magnetic tapes.

The neural network architecture may be a deep neural network (DNN) architecture. The DNN architecture may include a pre-trained DNN 302 (hereinafter referred to as "DNN 302") and a DNN-based feature database 304. The DNN 302 may represent a machine learning model including a set of input layers, a set of hidden layers, and a set of output layers. The DNN 302 may be a pre-trained DNN which may use a pre-existing model, trained on a large dataset of images, for feature extraction. Further, the DNN-based feature database 304 may include data pertaining to the DNN 302, such as learning techniques, deep recognition patterns, and so on. For example, the DNN-based feature database 304 may store a plurality of feature vectors pre-extracted from a plurality of images.

The DNN 302 may also include a DNN-based feature database in communication with a library of images. Each image from the library of image may include one or more instances of the object having a wide variance of appearance. The variation of appearance may involve different orientations, illumination conditions, image scale, image quality, and so on. The image may include the object, which is required to be searched and localized, along with multiple other objects of different classes. In an example, the DNN-based feature database 304 may include a pre-fetched plurality of feature vectors associated with the images included in the library of images.

In one embodiment of the present disclosure, the DNN-based feature database 304 may contain a list of images containing objects of interest. These images are obtained from road/traffic scene images by using a pre-trained deep neural network trained for the task of semantic segmentation.

In an example, the computing system 100 may also include a processor 112 coupled to the memory 110, a feature extraction module 104, a patch generation module 106, a similarity search module 116 and a refinement module 108. All the components of the computing system will be described in detail below.

The processor 112 may include image processors, micro-computers, microcontrollers, digital signal processors, central processing units, state machines, logic circuitries, and/or any other devices that manipulate signals and data based on computer-readable instructions. Further, functions of the various elements shown in the figures, including any functional blocks labelled as "processor(s)", may be provided with dedicated hardware as well as hardware capable of executing computer readable instructions.

Further, the computing system 100 may include interface(s) 114. The interface(s) 114 may include a variety of interfaces, for example, interface(s) for users. The interface (s) 114 may include data output devices. In an example, the interface(s) 114 may provide an interactive platform for receiving inputs from a user. For example, the user may provide feedback for first instance of labeling an object in order to verify if the candidate image patches is similar the visual template for the object, provided as an input to the computing system 100 through the interface(s) 114.

The present subject matter involves providing by a processor 112 of a computing system 100, a set of visual image templates 102 representing an input object 7 to a pre-trained deep neural network (DNN) 302. In one embodiment, the set of visual image templates 102 comprising of different objects to diversify the range of shapes and content to represent object type of broad object level. In an example, the user may upload the input visual image templates 102 to the computing system 100 as a query. Further, the visual image templates of the object (hereinafter input 102) are provided to a pre-trained deep neural network (DNN) 302. In an example, the visual image templates 102 of the object, wherein object may include a traffic sign, vehicle(s), pedestrian(s), road sign(s), and the like.

Further, the feature extraction module 104 is configured to extract a set of feature vectors 208 representing set of visual image templates 102 and a list of images 216 stored in a DNN-based feature database 304. The set of features may represent a set of characteristics, such as a shape, color profiles, texture pattern, or a combination thereof, associated with the visual image templates 102. In an example, the DNN 302 may generate a feature vector 208 from the set of features. The feature vector 208 may be a representation of the object in visual image templates 102.

The similarity search module 116 is configured to compare the feature vector 208 with a plurality of feature vectors 212 corresponding to a list of images 216 stored in a DNN-based feature database 304, in order to retrieve neighbor images. In one embodiment, the similarity search module 116 may use a distance function, cosine or Euclidean to compute the similarity score between the visual template 102 and the images present in DNN database 304. Further, based on the comparison, the processor 112 may obtain a set of relevant neighbor images 210, representing search object in the input visual image templates 102. The set of relevant neighbor images 210 are retrieved by using a distance function, cosine or Euclidean to compute the similarity score between the visual template 102 and the images present in DNN database 304.

In one embodiment, the similarity search module 116 is further configured to compute a similarity score of the feature vector 208 with each of the plurality of feature vectors stored in the DNN-based feature database 304 by comparing the feature vector 208 with each of the plurality of feature vectors.

The patch generation module 106 is configured to generate image patches representing the input object, from said plurality of relevant neighbor images 210 providing probable regions where the visual image templates 102 are getting matched. The patch generation module 106 is further configured to train a new network model in a self-supervised manner, with image patches generation by the patch generation module 106. The new network model is provided with the image patches without any labels. In one embodiment, new network model replaces pretrained deep neural network (DNN) 302 which was used earlier in the image patches generation stage and the loop continues.

In operation of the present disclosure, the computing system 100 gets seeded by objects of interest which are represented by visual templates 102. These visual templates are used to start the loop of curation of images. Initially a pre-trained model which is trained on large scale classification open data and available in common open-source frameworks is used for feature extraction. In an exemplary embodiment, the examples of such open-source framework may include PyTorch and the like. Using this model, features are extracted for the visual templates and the images from the database. Nearest neighbor similar images are retrieved for each of the visual template from the database. Further, the patch generation module 106 generates candidate patch images from these neighbor images providing probable regions where the template is getting matched. Since these neighbors are based on features from the pre-trained models which is trained on a different dataset, there will be many image patches which will be irrelevant i.e., dissimilar to the input visual template. The refinement module 108 is configured to filter out the false positives from the plurality of image patches generated by the patch generation module 106.

In one embodiment, the filtering techniques may apply on these image patches to remove the irrelevant ones. On these filtered image patches, a new network may be trained in a self-supervised manner i.e. without any labels. This newly trained model is again used for the image patches generation and the iterative refinement of the image patches take place with each new model in a loop. In an embodiment of the present disclosure, there are two types of the filtering techniques may be used. One is automatic refinement based on limiting nearest neighbors within a chosen Euclidean distance. At second filtering technique, an user can act as labeler for first instance of labeling the object in order to verify if the candidate image patches are similar the visual template for the object.

For each image in the database 304, their corresponding feature vectors are calculated using a deep neural network. This network is pre-trained on a large number of diverse images. In one embodiment of the present disclosure, the computing system 100 employs a Self-Supervised Pre-training mechanism (SSL), in order to learn robust representation of images against variations in resolution, pose and external factors like illumination.

Furthermore, the self-supervised model is tuned for such data and can produce better quality of the image patches for the target use case, based on limiting nearest neighbors within a chosen Euclidean distance. A second stage of refinement can be added where the image patches are again re-ranked for their distance and then only image patches within a specified distance will be considered. For example, the former limits at the full image/scene level whereas the latter limits at the image patches/patch level.

Figure 2:
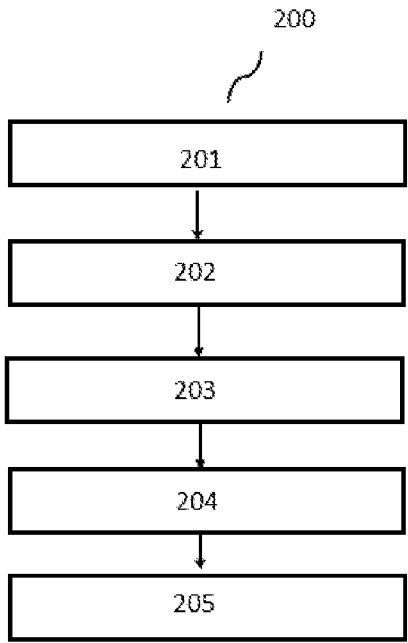
FIG. 2 illustrates a flow chart of a method for iteratively curating images containing specific objects specified by visual templates, in accordance with an example implementation of the present subject matter.

FIG. 2 illustrates a flow chart of a method 200 for curating images containing specific objects specified by visual templates in accordance with an example implementation of the present subject matter. The method 200 may be implemented by the computing system 100 including the memory 110, the processor 112, and the interface(s) 114, of FIG. 1. Further, the computing system 100 may be communicatively coupled with the neural network architecture as described in FIG. 1. The neural network architecture may include a DNN 302 and a DNN-based feature database 304. Although, the method 200 is described in context of the system that is similar to the computing system 100 of FIG. 1, other suitable devices or systems may be used for execution of the method 200.

At block 201, the method 200 involves providing by the processor 112 a set of visual image templates 102 representing an input object to a pre-trained deep neural network DNN 302. In an example, the visual image templates 102 of the object, wherein object may include a traffic sign, vehicle(s), pedestrian(s), road sign(s), and the like.

At block 202, the method 200 involves extracting, from the pre-trained DNN 302, a set of feature vectors 208 representing set of visual image templates 102 and a list of images 216 stored in a DNN-based feature database 304, by a feature extraction module 104. At block 203, the method 200 involves retrieving from the pre-trained DNN 302 a plurality of relevant neighbor images 210 representing each of the visual image templates 102, by a similarity search module 116. In this step 203 of the method 200, the feature vector 208 obtained in step 202 is being compared with a plurality of feature vectors 212 corresponding to a list of images 216 stored in a DNN based feature database 304. Based on the comparison of the feature vector 208 with a plurality of feature vectors 212, the neighbor images 210 representing search object in the input image patch 102, are retrieved.

At block 204, the method 200 involves generating image patches representing the input object, from said plurality of relevant neighbor images 210 providing probable regions where the visual image templates 102 are getting matched, by a patch generation module 106. At block 205, the method 200 involves training a new network model in a self-supervised manner, with image patches generation by the patch generation module 106.

Although aspects for the present disclosure have been described in a language specific to structural features and/or methods, it is to be understood that the appended claims are not limited to the specific features or methods described herein. Rather, the specific features and methods are disclosed as examples of the present disclosure.

What is claimed is:

1. A computing system, comprising:
   a memory; and a processor coupled to the memory and configured to:
   receive a set of visual image templates representing an input object;
   receive a plurality of images;
   generate a curated subset of images from the plurality of images, each image in the curated subset of images containing the input object, the curated subset of images being generated in an iterative loop, each iteration of the iterative loop including:
      extracting a set of feature vectors representing the set of visual image templates by inputting the set of visual image templates into a pre-trained deep neural network (DNN);
      extracting a plurality of feature vectors representing the plurality of images by inputting the plurality of images into the pre-trained DNN;
      retrieving, based on the set of feature vectors representing the set of visual image templates and the plurality of feature vectors representing the plurality of images, a plurality of relevant neighbor images from the plurality of images representing each of the visual image templates in the set of visual image templates;
      generating a plurality of image patches representing the input object from the plurality of relevant neighbor images, each image patch including a region of one of the plurality of relevant neighbor images where the visual image templates are getting matched; and
      training a new network model in a self-supervised manner using the plurality of image patches,
   wherein the new network model replaces the pre-trained DNN in each subsequent iteration of the iterative loop.

2. The computing system as claimed in claim 1, wherein the new network model is provided with the image patches without any labels.

3. The computing system as claimed in claim 1, the processor being further configured to filter out false positives from the plurality of image patches.

4. The computing system as claimed in claim 1, wherein the set of visual image templates comprises different objects to diversify a range of shapes and content to represent object type of broad object level.

5. The computing system as claimed in claim 1, the processor being further configured to compare the set of feature vectors representing the set of visual image templates with the plurality of feature vectors representing the plurality of images in order to retrieve the plurality of relevant neighbor images.

6. The computing system as claimed in claim 5, the processor being further configured to compute a similarity score of each of the set of feature vectors with each of the plurality of feature vectors by comparing each of the set of feature vectors with each of the plurality of feature vectors.

7. A method for curating images containing specific objects specified by visual templates, the method comprising:
   receiving, with a processor of a computing system, a set of visual image templates representing an input object;
   receiving, with the processor, a plurality of images;
   generating, with the processor, a curated subset of images from the plurality of images, each image in the curated subset of images containing the input object, the curated subset of images being generated in an iterative loop, each iteration of the iterative loop including:

extracting a set of feature vectors representing the set of visual image templates by inputting the set of visual image templates into a pre-trained deep neural network (DNN);

extracting a plurality of feature vectors representing the plurality of images by inputting the plurality of images into the pre-trained DNN;

retrieving, based on the set of feature vectors representing the set of visual image templates and the plurality of feature vectors representing the plurality of images, a plurality of relevant neighbor images from the plurality of images representing each of the visual image templates in the set of visual image templates;

generating a plurality of image patches representing the input object from the plurality of relevant neighbor images, each image patch including a region of one of the plurality of relevant neighbor images where the visual image templates are getting matched; and training a new network model in a self-supervised manner using the plurality of image patches, wherein the new network model replaces the pre-trained DNN in each subsequent iteration of the iterative loop.

* * * * *